Figure 1:
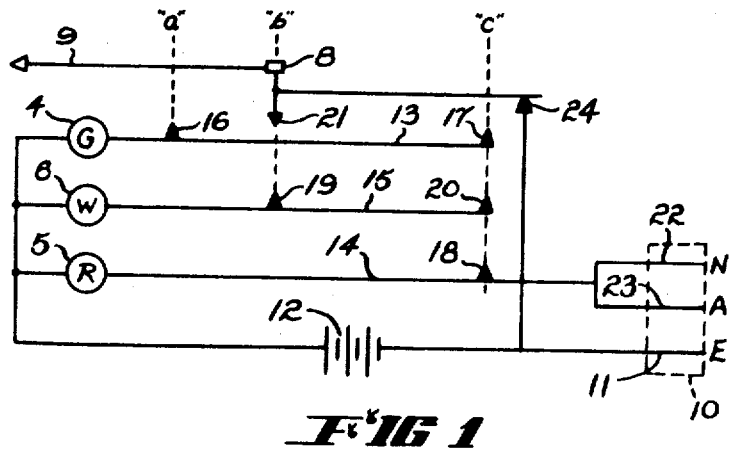

United States Patent
Jamieson

[15] 3,704,411
[45] Nov. 28, 1972

[54] PORTABLE DEVICE FOR TESTING ELECTRICAL APPLIANCES

[72] Inventor: Ian K. Jamieson, 9 Kinkaid Road, Elizabeth East, Australia

[22] Filed: Aug. 14, 1970

[21] Appl. No.: 63,882

[30] Foreign Application Priority Data

Aug. 18, 1969 Australia ......................59660
March 4, 1970 Australia ......................0514

[52] U.S. Cl. ...................................................324/53
[51] Int. Cl. ............................................G01r 31/02
[58] Field of Search.................................324/51, 53

[56] References Cited

UNITED STATES PATENTS

| | | |
|---|---|---|
| 2,442,771 | 6/1948 | Kirkpatrick ..................324/51 |
| 2,858,507 | 10/1958 | Liautaud et al. ..........324/51 X |
| 2,994,819 | 8/1961 | Vincent ......................324/51 |
| 3,181,060 | 4/1965 | Hull..............................324/51 |
| 3,368,146 | 2/1968 | Regan et al..................324/51 |
| 3,047,798 | 7/1962 | Winslett ......................324/53 |
| 3,579,100 | 5/1971 | Lauver ........................324/53 |

*Primary Examiner*—Gerard R. Strecker
*Attorney*—Oldham & Oldham

[57] ABSTRACT

A device operable as a torch or a testing device to test the circuitry of an electrical appliance for safety. The appliance is plugged into the device whereby the device can indicate the continuity of the earths connection of the appliance and also indicate and detect any leak between the windings of the appliance and its earth connection. The device can also be used to test its own indicators before being used as a test appliance.

4 Claims, 5 Drawing Figures

Inventor:
Ian F. Jamieson
By: Oldham and Oldham
attys.

PORTABLE DEVICE FOR TESTING ELECTRICAL APPLIANCES

This invention relates to a device particularly adapted to enable a quick and ready test of an electrical appliance to ensure that this is reasonably safe for use.

It is well known that numerous fatalities occur due to faulty or deteriorated wiring of an appliance. Statistics have shown that in 1 recent year at least 30 people were killed in Australia due to incorrect wiring of a domestic appliance or to a breakdown in the installation or a disconnecting of one part of the wiring.

The problem with the usual appliance is that this condition can exist for some time without knowledge by the user or it can develop slowly, but it becomes suddenly a potentially fatal fault and it is generally impossible or at least impractical with the present art for most people to detect the existence of this fault.

The current method of detecting such faults is to use continuity checks from the plug and from the earth connection of the plug to the body of the appliance using either a small resistance meter or a small buzzer unit and it is generally only in this way that the dangerous situation is detected. Obviously this method requires knowledge of the complexities of any electrical circuit which although basically simple are not known by the vast majority of people, and it is therefore impossible to expect that the majority of people would be able to perform these comparatively simple tests with sufficient regularity to ensure that a fatal accident does not occur. Furthermore the test required is regarded as essentially an arduous one and it is to be very much doubted whether even if a person knows the essential techniques that they could be persuaded to persevere each time they intend to use the apparatus to provide or check the apparatus in this way.

Accordingly, it will be appreciated that this is a problem of substantial importance, but the problem relates as much to educate the public to test the apparatus as it is to devise means by which such testing can be readily carried out.

In the first place therefore an object of this invention is to propose such ready means by which the testing can be carried out, but it also proposes an answer to the problem that the testing apparatus will not normally be readily available and therefore not thought of or used to test the appliance before use.

In a broad concept of the invention, I propose a device which is to include a socket adapted to receive and contact individually with each of the pins of the plug of the appliance, the circuit within the testing unit including an indicator indicating a safe condition in the appliance, and is adapted to show a continuity between the body of the appliance and the earth pin as contacted at the plug.

In another aspect of the invention, the device also includes a further indicator indicating that a dangerous condition exists, by showing a small negligible resistance between the live or neutral contacts of the plug with the earth contact, or in other words, an electrical leak between the live circuit of the appliance and earth.

A further object of the invention is achieved by arranging the testing device in a form such that it can be used as a torch for use around the house or the like and so that therefore either, one of the indicators is a normal torch light, or a separate light is included, and can be used as such using the batteries incorporated in the tester when the device is not being used for testing purposes. It is believed that with this arrangement most householders will readily have this device available for use as a torch and will ascertain that batteries are kept in reasonable condition and that therefore the tester is both readily available for testing the appliances and its batteries will be in an acceptable condition for useful testing.

To facilitate this arrangement I prefer that the indicators in each case are visual indicators such as torch globes and that preferably the whole testing device is incorporated in a cylindrical or other shaped body to simulate the normal shape of a torch, the receiving plug being incorporated at one end of the device and the torch head being incorporated in the other end of the device.

Accordingly, and in my preferred embodiment I provide a testing device which comprises the form of a cylinder adapted to receive in the conventional way several 1.5 volt batteries to provide a voltage source for the testing. At one end a plug is provided to receive the plug of the appliance, the plug particularly for Australian uses being a three pin plug adapted to receive the universal plug used throughout Australia.

Further external pieces of the testing unit include the two indicators in this case two torch bulbs, one being arranged to show a red light and the other being arranged to show a green light, a test switch, and also an external probe adapted to contact the body of the appliance being tested.

Figure 2:
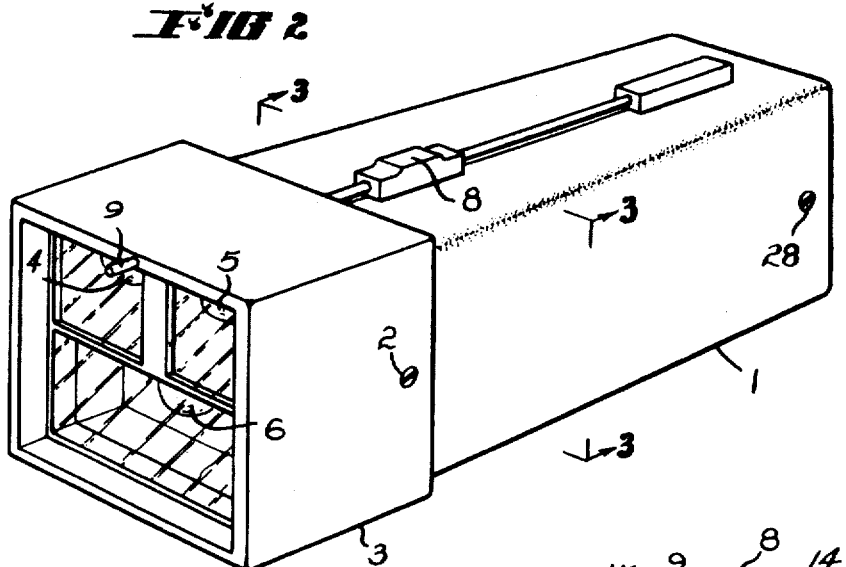
Figure 3:
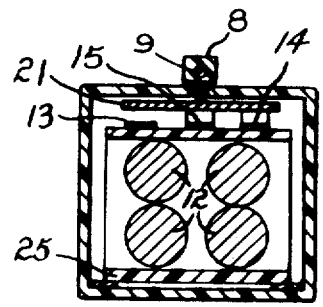
Figure 4:
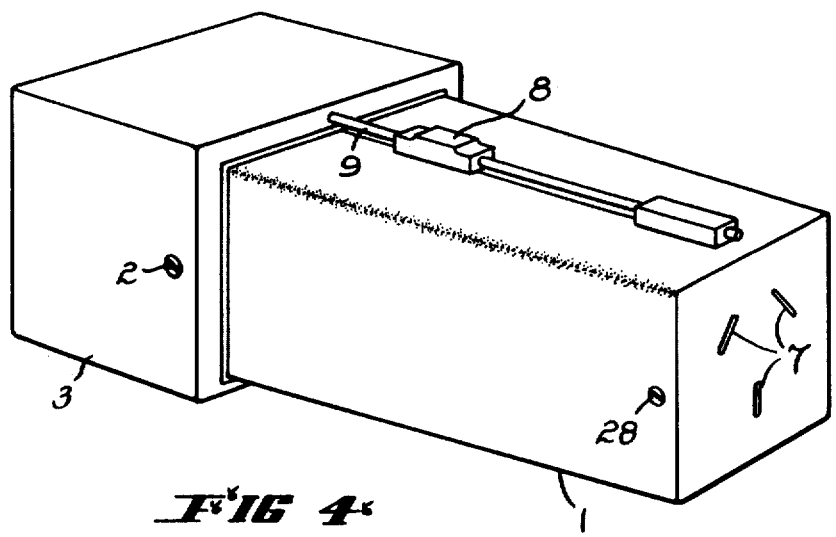
Figure 5:
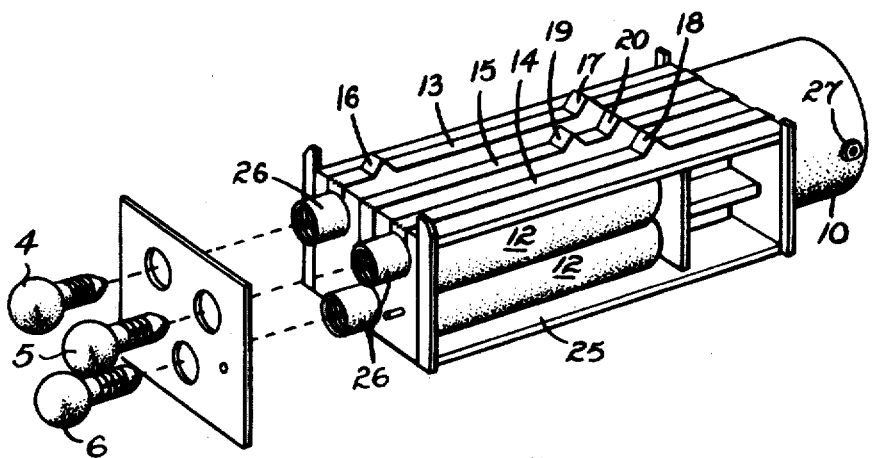

A preferred embodiment of the invention with reference to the accompanying drawings will be described in which, FIG. 1 is a diagrammatic view of the electrical circuit of the device, FIG. 2 is a perspective view of the device from the end showing the indicators, FIG. 3 is a cross-sectional view along the lines 3—3 of FIG. 2, FIG. 4 is a perspective view of the device from the end showing the electrical socket and FIG. 5 is a perspective view of the interior of the device being partly exploded for easier viewing.

Referring firstly to FIGS. 2 to 5 a device is formed of a body 1 which is shown as rectangular but could be of any suitable shape. A head 3 incorporating the indicator globes 4 and 5 and the torch globe 6 is connected by screws 2 to the body 1.

As shown in FIG. 4 the end of the body is formed with apertures 7, into which the plug of the appliance to be tested is adapted to be inserted. On top of the device is mounted the actuating member 8 of a sliding switch, and to the end of the actuator is attached a retractable probe 9 the purpose of which will later be described.

For a clearer understanding of the invention the circuit arrangement will now be described. Referring to FIG. 1 the electrical socket 10 into which the plug of the appliance is adapted to be inserted has its earth terminal 11 attached to one end of the battery 12 the other end of the battery being connected to one side of each of the globes 4, 5 and 6. Each of the globes at their other sides have connected thereto lines in the form of metal strips 13, 14 and 15, the metal strip 13 having spaced contact points 16 and 17, the strip 14 having a contact point 18, and the strip 15 having spaced contact points 19 and 20. The contact points 17, 18 and 20 are all aligned, the contact point 19 is spaced therefrom, while contact 16 is further spaced therefrom. These three spacings form the three positions A, B and C for a three position switch.

As shown diagrammatically in FIG. 1, the switch is shown as having the probe 9 rigidly attached to the switch actuator 8, the switch comprising a movable contact 21 which in position A engages contact 16. On moving this switch to the position B, the contact 21 engages the contact 19, while in the position C the contact 21 engages the three contacts 17, 18 and 20. Of course it will be realized that the three strips 13, 14 and 15 are spaced side by side, and the contact 21 is of a length sufficient to engage the three contacts 17, 18 and 20 in the position C.

The strips 15 and 16 terminate at the contacts 20 and 17 respectively, while strip 14 is connected by a bridge to both the neutral line 22 and the active line 23 which terminate in the socket 10.

The probe 9 attached to the switch actuator is of such a length that when the switch is in position A the probe protrudes beyond the end of the head 3, but is retracted in the other positions of the switch. Furthermore the switch in the positions B and C where the probe is retracted is in contact with a further contact 24 which in turn is connected to the battery, but when the switch is moved to position A the switch breaks its contact from the contact 24.

As noted earlier the device can also be used as a torch. By moving switch actuator to position B it will readily be seen that a circuit is completed through globe 6. The use as a torch ensures that the device is always to hand and readily available for use as a tester, and also ensures that the batteries are in a usable condition for usually when the battery of a torch starts to fail a replacement is quickly purchased.

Returning now to the description of the device particularly as shown in FIGS. 3 and 5, it can be seen that a plurality of batteries 12 are used preferably in number 4 and are mounted in a casing 25 which casing also supports at one end the lamp holders 26 and plate 29 to secure the lamps 4, 5 and 6. At the other end of the casing there is mounted a three pin socket 10, the three pin socket having threaded means in the form of a nut attached thereto to secure the casing inside the body by means of a screw 28.

The copper strips 13, 14 and 15 with their contacts 16 to 20 are secured to the casing and connected to their respective lamp holders. Strips 13 and 15 terminate at their rear end of the casing, while strip 14 is connected via the bridge to the neutral and active terminals of the plug. The battery block is connected by lines (not shown) to the other terminals of the globes 4, 5 and 6 while the other end of the battery is connected by a line (not shown) to the contact 24 engaging the switch.

The operation of the device will now be described before using the device to test an appliance it is desirable to test the device itself to determine any faults in the device itself that is blown globes or flat batteries. To test the device the switch actuator 8 is moved to position C where the contact 21 engages the contacts 17, 18 and 20. It will be seen that a circuit is then completed between the battery 12 and the three globes 4, 5 and 6 in parallel, strips 13, 14 and 15, contacts 17, 18 and 20, switch contacts 21, and through contact 24 back to the battery. This will determine the state of the device its globes and battery.

To test an electrical appliance, the three pin plug of the appliance is then inserted into the socket 10 of the device, and the switch actuator is then moved to the A position which also projects the probe 9. If the probe 9 is now touched on to the casing of an appliance, the light 4 (colored green) if it is lit, then indicates a sound earth connection between the appliance casing and the earth terminal 11 of the electric plug. In this condition the circuit is completed from the battery through the light 4, strip 13, contact 16, probe 9, electrical appliance casing, earth wire of the casing to terminal 11 and back to the battery. If the green light does not show then the appliance is not effectively earthed.

During this test it is also possible to determine whether there is any defective wiring or insulation in the appliance whereby an electrical current could flow from the electrical circuit to the device to earth. Thus if an electrical leak occurs between the neutral and/or active lines in the appliance to earth, the light 5 (colored red) would glow due to the circuits of battery 12, red light 5, strip 14, neutral and/or active line, leak through appliance and back along the earth line to the battery. This test can be made with the switch intermediate positions A and B and is usually carried out before the earthing continuity test as described above. Alternatively both tests could be carried out at the same time.

As a final check it is worthwhile testing the testing device immediately after the tests are made simply to ensure that for some reason some lead has not been broken off during the testing. Using the test as I have now described it one can be assured that there is no obvious fault in the appliance and, although the battery voltage would only be 3 volts and therefore an insulation breakdown will not be detected normally this will still not cause a fatality as the insulation remaining usually has sufficient resistance to retard the current through the person that might be accidentally shocked. The test given therefore with the device ensures safety although it is not intended and will not necessarily ensure that the appliance will work or that the neutral and active leads are not interposed.

With the proposal application of the testing device for use as a torch instead of a separate torch globe, one of the indicator lights could be used and this normally would be the green light, which could either have a very light green glass or it could have a clear glass and be held in a reflector so that it could be normally used as a torch when desired. Obviously the internal circuitry can be altered to allow for different types of switching devices for a quick testing of the circuit of the actual testing device, but this likewise would be included within the scope of the invention.

Further to the above embodiment it has been found that by the incorporation of a small modification to the circuit and the incorporation of a double pole switch, a continuity check between the live and neutral wires of the appliance being tested can be made.

It has been discovered that most electrical appliances have a D.C. resistance sufficiently low to allow a torch globe of common type to be at least partially lighted when excited by a small D.C. voltage such as can be gained by several common torch batteries. The resistance as opposed to the impedance of a normal A. C. motor is usually very low, and this check can be a very useful one at least to ensure that main leads are completing the circuit.

The modification to the device already described includes instead of the bridge between the neutral and active lines there could be incorporated a two pole switch, the contacts of which connects one of the angular blades of the input socket directly to one side of the torch globe, the other contact of the same side of the switch being directly connected to the other angular blade of the input socket and connecting this to one side of the battery. The indicator bulb is continuously connected through to the other side of the battery, the whole result being that when the several contacts of the double pole switch are closed on the side referred to, a circuit of relatively low resistance through the several angularly related blades of the input socket which in effect is the live and neutral of any appliance, will result in some light showing in the torch bulb. In the other position of the two pole switch, the neutral and active lines are bridged, and the device operates as above described.

One further advantageous addition to the embodiment described includes the addition of an external test point which is a point connected directly to the earth point of the input connector which is in turn directly connected to the one side of the battery.

What I claim is:

1. A portable testing device for testing the safety of an electrical appliance comprising a housing containing in combination an electrical circuit, a battery, a three pin socket including a ground, one terminal of the battery being connected to the ground pin, first indicator means in the form of a light, second indicator means in the form of a white light, and a third light, each of the lights being connected to the other terminal of the battery, a probe attached to a sliding three positioned switch, the neutral and active leads of the socket being bridged and connected to the second indicator means, the sliding switch being adapted to be connected to each of the lights and being directly connected to the one terminal of the battery in the second and third positions of the switch, whereby in the third position of the switch the three lights are connected in parallel, in the second position the white light only operates, while in the first position the switch is disconnected from the one terminal of the battery but completes the circuit to the probe which is adapted to contact the appliance casing, the casing normally being grounded to connect to the ground pin, and from it to the battery and the first indicator means, and in which position any leak between the neutral and/or active leads of the appliance is indicated by the second indicator means.

2. A portable testing device as defined in claim 1 wherein the probe is operable only when the switch means is in a first position to contact the casing of the appliance for testing the grounding thereof, and the three position switch provides an indication of any leak between the neutral and/or active leads of the appliance between positions one and two of said switch.

3. A portable testing device as defined in claim 1 wherein the second indicating means comprises an electric globe of any color.

4. A portable testing device as defined in claim 1 wherein a body is provided to position the components of the testing device, said probe is operatively positioned on said body and extends therefrom only in the first position of said switch.

* * * * *